United States Patent [19]

Vandevier

[11] Patent Number: 4,521,708
[45] Date of Patent: Jun. 4, 1985

[54] MOTOR BEARING WITH LOCKING PINS

[75] Inventor: Joseph E. Vandevier, Claremore, Okla.

[73] Assignee: Hughes Tool Company, Houston, Tex.

[21] Appl. No.: 589,810

[22] Filed: Mar. 15, 1984

[51] Int. Cl.³ .............................................. H02K 5/16
[52] U.S. Cl. ...................................... 310/87; 277/136; 310/90; 384/218
[58] Field of Search .................... 310/87, 90; 277/136; 384/218

[56] References Cited

U.S. PATENT DOCUMENTS

| Re. 28,094 | 7/1974 | Boyd | 310/90 |
| 971,978 | 10/1910 | Dittrich | 277/136 |
| 2,747,948 | 5/1956 | Jergens | 308/236 |
| 3,136,905 | 6/1964 | Zapf et al. | 310/87 |
| 3,150,900 | 9/1964 | Bruenig | 384/218 |
| 4,119,874 | 10/1978 | Beavers et al. | 310/90 |
| 4,453,099 | 6/1984 | Flat | 310/87 |

Primary Examiner—Peter S. Wong
Assistant Examiner—D. L. Rebsch
Attorney, Agent, or Firm—Robert A. Felsman; James E. Bradley

[57] ABSTRACT

An electric motor has features for preventing the bearings from rotating. The motor has a stator mounted in a housing. A rotor is rotated within the stator. The rotor is divided into rotor sections, with bearings spaced between. Each bearing has an outer portion that contains outwardly biased pins. The pins engage slot gaps formed in the stator laminations.

4 Claims, 3 Drawing Figures

MOTOR BEARING WITH LOCKING PINS

BACKGROUND OF THE INVENTION

1. Field of the Invention

This invention relates in general to submersible pump motors, and in particular to a bearing assembly that resists rotation and is located between rotor sections for supporting the shaft of the motor.

2. Description of the Prior Art

A submersible pump is a centrifugal pump having a submersible motor that rotates the shaft to drive the pump. The motors for high volume oil and water production may be from six to sixty feet in length and be rated at several hundred horsepower. Each motor has a stator secured within a tubular housing. A rotor secured to a shaft rotates within the stator.

Because of the long length, the rotor is made up of a number of rotor sections. Each rotor section comprises a large number of flat disks called laminations that are secured by copper rods. The rotor sections are spaced-apart from each other, and a bearing assembly is located between each section for maintaining the shaft in axial alignment. The rotor sections are keyed to the shaft for rotation, but are axially movable with respect to the shaft.

Each bearing assembly includes a sleeve keyed to the shaft for rotation. A journal, commonly called a bearing, has a bore with a periphery that frictionally engages the inner wall of the stator at operating temperatures to prevent the bearing from rotating and to support the shaft in alignment.

As the motor heats up to operating temperature, the bearing will expand slightly outward to more tightly grip the stator. Also, the rotor will likely grow longitudinally at a rate greater than the stator, causing the bearing to move longitudinally with respect to the stator. The bearing must be precisely dimensioned so that it does not engage the stator wall so tightly as to create excessive thrust loads on the bearing member. For accurate dimensioning, the bearing is normally constructed of a metal with an outer wall ground to a 0.0005 inch tolerance. While usually satisfactory, on occasion the bearing begins to spin with the shaft, causing heat and metal surfaces galling which ultimately leads to oil contamination and dielectric breakdown.

Proposals have been made to prevent the bearing from rotating. For example, in application Ser. No. 538,646, filed Oct. 3, 1983, Anti-Rotation Motor Bearing, David I. Del Serra, an annular elastomer for fitting about the bearing periphery is shown. The elastomer swells during operation to engage the stator inner wall to prevent rotation of the bearing. In U.S. Pat. No. 4,435,661, issued Mar. 6, 1984, Submersible Pump Motor Flexible Bearing, Raymond L. Witten, a resilient bearing is shown. The bearing has slots through the periphery to allow the bearing to be compressed during operation, to prevent rotation of the bearing. While these proposals have merit, other manners of solving the problem may be possible.

SUMMARY OF THE INVENTION

In this invention, the bearing is provided with pins which move outward during operation to prevent rotation of the bearing. In the preferred embodiment, the pins are located in radial cavities spaced around the periphery of the bearing. The pins are located so as to engage gaps provided between the slot teeth of the stator laminations. A coil spring behind each pin pushes the pin outwardly into the gap to resist rotation of the bearing. Each pin has a piston portion, which augments the force of the spring by hydraulic pressure created in the inner diameter of the bearing.

DESCRIPTION OF THE PREFERRED EMBODIMENT

Figure 1:
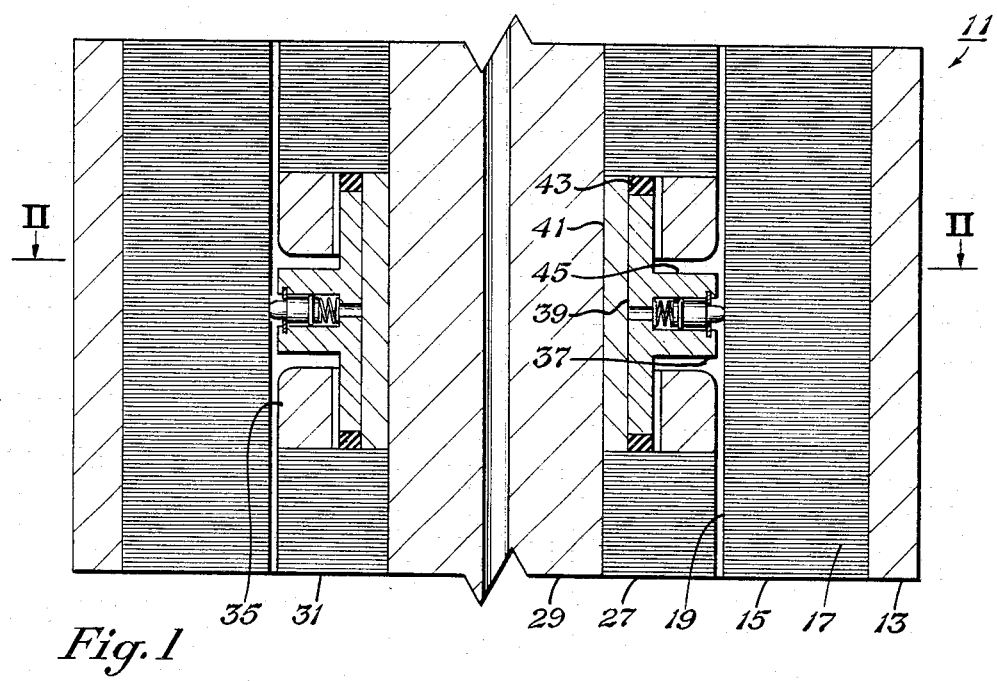
FIG. 1 is a partial, vertical sectional view of an electric motor having a bearing constructed in accordance with this invention.

Referring to FIG. 1, electric motor 11 includes a cylindrical housing 13. A stator 15 is rigidly mounted within housing 13. Stator 15 is made up of a large number of flat metallic disks 17, called laminations. Each lamination 17 has a central or axial aperture that aligns with all the other laminations 17, defining an inner wall 19. Inner wall 19 is cylindrical and of uniform diameter.

Figure 2:
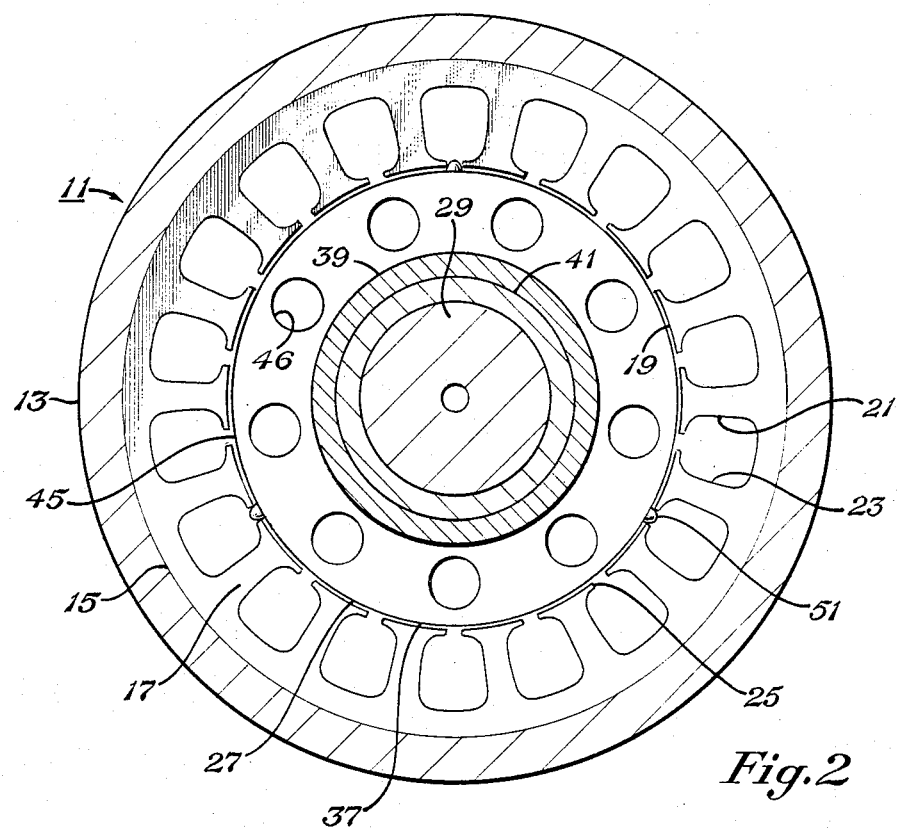
FIG. 2 is a cross-sectional view of the motor of FIG. 1, taken along the line II—II of FIG. 1.

Referring to FIG. 2, each lamination 17 has a plurality of slots 21 uniformly spaced in a circular pattern. Each slot 21 has on its inner edge a pair of teeth 23 that face each other. Teeth 23 are spaced apart from each other by a gap 25. Wires (not shown) are wound through liners (not shown) in the slots 21, which are subsequently filled with epoxy. The gaps 25 remain open, and free of epoxy, resulting in parallel vertical grooves extending down the length of the inner wall 19 and spaced around the diameter.

Referring to FIG. 1, a rotor 27 is rotatably mounted within the inner wall 19 of stator 15. Rotor 27 comprises a shaft 29 and a large number of metallic disks or laminations. The laminations are grouped in rotor sections 31, which are approximately 15 inches in length. Each rotor section 31 has copper rods (not shown) extending through it. The rods are secured at their ends by means of end rings 35. Each rotor section 31 is secured by a key (not shown) to shaft 29 for rotation. The rotor sections 31 are free to move vertically to some extent on shaft 29 to accommodate increase in length due to rise in temperature.

A bearing assembly is located between each of the rotor sections 31. The bearing assembly includes a bearing 37 which has an inner portion 39. Inner portion 39 is cylindrical and has an inner diameter mounted on a bushing 41. Bushing 41 is keyed to shaft 29 for rotation, while the bearing inner portion 39 will remain stationary. Thrust washers 43 are located at the top and bottom of bearing inner portion 39. Bushing 41 supports the weight of the rotor sections 31 and transmits any force between one rotor section 31 to the other rotor section 31. The thickness of the thrust washers 43 is selected to provide a total height from the lower edge of the lower thrust washer 43 to the upper edge of the upper thrust washer 43 that is less than the height of bushing 41. This prevents the thrust washers 43 from bearing the weight of the rotor sections 31 located above.

Bearing 37 has a flange or outer portion 45 that extends radially outward from the inner portion 39. Outer portion 45 has a cylindrical periphery that is spaced inward from inner wall 19 of the stator 15, and has a diameter slightly greater than the rotor sections 31. The longitudinal thickness or height of the outer portion 45 is less than the distance between two adjacent end rings 35. A plurality of passages 46 (FIG. 2) extend through the outer portion 45 for communicating oil contained within the housing 13. Bearing 37 is of a metallic material, preferably.

Figure 3:
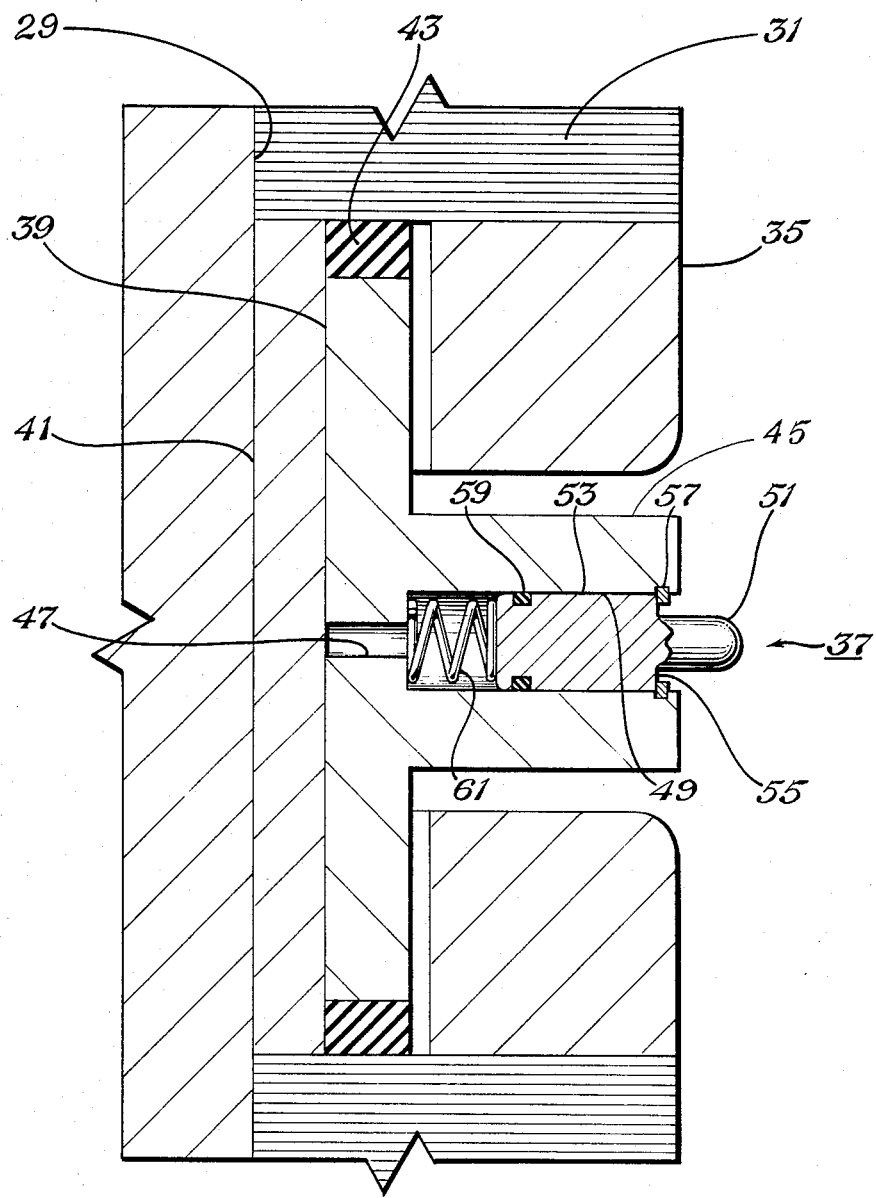
FIG. 3 is an enlarged, partial view of the bearing of FIG. 1.

Referring to FIG. 3, bearing outer portion 45 has a plurality of horizontal cavities or holes 47 extending through it. Each hole 47 has an axis that lies on a radial line of the axis of shaft 29. Preferably, there are three of the holes 47, each spaced 120 degrees apart from the other. Each hole 47 extends from the inner diameter of the inner portion 39 into a counterbore section 49. The counterbore 49 extends to the periphery of the outer portion 45 and is of greater diameter than the inner portion of the hole 47.

A metal pin 51 is carried within each counterbore 49. Pin 51 has a cylindrical base 53 that is slidingly and closely received within the counterbore 49. Base 53 is of larger diameter than the protruding portion of pin 51, defining an outwardly facing shoulder 55. A snap ring 57 is located in a groove formed in the counterbore 49. Snap ring 57 serves as stop means to limit the outward travel of pin 51 by contact with shoulder 55. An O-ring 59 encircles base 53 for providing sealing within the counterbore 49, and causes base 53 to act as a piston in a cylinder. A coil spring 61 is compressed between the inner end of pin 51 and the inner end of counterbore 49. Coil spring 61 acts as spring means for urging the pin 51 outward to protrude past the periphery of the bearing outer portion 45 and the outer diameter of the rotor sections 31. The spring 61 can be compressed to allow the pin 51 to move back substantially flush with the outer diameter of bearing outer portion 45.

In assembling the motor 11, the bearing is assembled between the rotor sections 31 and the rotor 27 is inserted into the stator 15. The pins 51 are not aligned with the gaps 25 during insertion, and will move back into holes 47, compressing springs 61. The coil spring 61 urges each pin 51 out to contact stator inner wall 19. Rotor 27 will be secured in a conventional manner and the housing 13 will be filled with oil.

In operation, electrical current passed through the windings of the stator 15 will cause the rotor 27 to rotate. The bushing 41 will rotate with the shaft 29. Any torque on bearing 37 will rotate bearing 37 until pins 51 snap into gaps 25. The spinning bushing 41 creates a hydraulic positive pressure in hole 47, which acts against the piston formed by base 53 to push pin 51 outwardly. The hydraulic force augments the force provided by springs 61. The bearing 37 will remain stationary because of the engagement of the pins 51 in the gaps 25. Torque on the bearing 37 is resisted by the pins 51 bearing against the sides of teeth 23. Heat will cause the rotor sections 31 to expand longitudinally. The bearing 37 will be allowed to move longitudinally to accommodate growth, with the pins 51 sliding within the gaps 25. Bearing 37 will also expand radially with heat and its periphery may engage the inner wall 19 of stator 15.

The invention has significant advantages. The locking pins provide a positive means for the bearing to engage the stator to prevent rotation. Because the periphery of the bearing does not contact the inner wall of the stator, close tolerances are not required. The springs allow easy insertion of the rotor into the stator.

While the invention has been shown in only one of its forms, it should be apparent to skilled in the art that it is not so limited but is susceptible to various changes without departing from the scope of the invention.

I claim:

1. An elongated electric motor for a submersible pump, comprising in combination:
   a housing filled with lubricating fluid;
   a stator mounted in the housing and having an inner wall;
   a rotatable shaft mounted within the stator;
   a rotor composed of spaced-apart rotor sections mounted on the shaft;
   a bearing mounted between each of the rotor sections, having an inner diameter and an outer periphery; and
   at least one locking element carried by each of the bearings, each locking element being reciprocally located in a passage extending from the inner diameter to the periphery of the bearing, the passage being in communication with hydraulic presure in the inner diameter of the bearing created by rotation of the shaft, the hydraulic pressure urging the locking element outward into engagement with the inner wall of the stator to prevent rotation of the bearing.

2. An elongated electric motor for a submersible pump, comprising in combination:
   a housing filled with lubricating fluid;
   a stator mounted in the housing and having an inner wall containing at least one groove;
   a rotatable shaft mounted within the stator;
   a rotor composed of spaced-apart rotor sections mounted on the shaft;
   a bearing mounted between each of the rotor section, having an inner diameter and an outer periphery; and
   at least one locking element carried by each of the bearings, each locking element being reciprocally located in a radially oriented passage extending from the inner diameter to the periphery of the bearing, the passage being in communication with hydraulic pressure on the inner diameter of the bearing created by rotation of the shaft, the hydraulic pressure urging the locking element outward into engagement with the groove of the stator to prevent rotation of the bearing.

3. An elongated electric motor for a submersible pump, comprising in combination:
   a housing;
   a stator mounted in the housing and having an inner wall containing at least one groove;
   a shaft mounted within the stator;
   a rotor composed of spaced-apart rotor sections mounted on the shaft;
   a bearing mounted between each of the rotor sections, having an inner diameter and an outer periphery;
   at least one pin carried by each of the bearings, each pin being reciprocally located in a radially oriented passage extending from the inner diameter to the periphery of the bearing; and
   annular seal means located between the passage and the pin for sealing the pin in the passage to cause hydraulic pressure in the inner diameter of the bearing to urge the pin outwardly.

4. An elongated electric motor for a submersible pump, comprising in combination:

a housing;

a stator mounted in the housing and having an inner wall containing at least one groove;

a shaft mounted within the stator;

a rotor composed of spaced-apart rotor sections mounted on the shaft;

a bearing mounted between each of the rotor sections, having an inner diameter and an outer periphery;

at least one pin carried by each of the bearings, each pin being reciprocally located in a radially oriented passage extending from the inner diameter to the periphery of the bearing;

annular seal means located between the passage and the pin for sealing the pin in the passage to cause hydraulic pressure in the inner diameter of the bearing to urge the pin outward;

a coil spring located in the passage inward and in contact with the pin for also urging the pin outward into the groove; and stop means for limiting the amount of outward movement of the pin.

* * * * *